United States Patent [19]
Maruta et al.

[11] Patent Number: 5,056,075
[45] Date of Patent: Oct. 8, 1991

[54] OPTICAL DISK PLAYER WITH DISK SIZE AND PICKUP LOCATION RESPONSIVE SKEW SERVO CONTROL

[75] Inventors: Keiji Maruta, Kanagawa; Masanobu Nishikata, Tokyo, both of Japan

[73] Assignee: Sony Corporation, Tokyo, Japan

[21] Appl. No.: 256,640

[22] Filed: Oct. 12, 1988

[30] Foreign Application Priority Data

Oct. 15, 1987 [JP] Japan ................. 62-260177

[51] Int. Cl.⁵ .................................. G11B 7/095
[52] U.S. Cl. .................. 369/44.29; 369/44.32; 369/47; 369/58
[58] Field of Search ............ 369/32, 44.27, 44.29, 369/44.32, 44.34, 44.35, 47, 50, 54, 58; 358/342

[56] References Cited

U.S. PATENT DOCUMENTS

| | | | |
|---|---|---|---|
| 4,634,853 | 1/1987 | Kanamaru | 369/44.32 X |
| 4,636,628 | 1/1987 | Tsukai | 369/44.32 X |
| 4,661,942 | 4/1987 | Yoshimoto et al. | 369/44.34 |
| 4,674,078 | 6/1987 | Otsuka et al. | 369/44.34 X |
| 4,698,695 | 10/1987 | Kosaka et al. | 369/50 X |
| 4,761,692 | 8/1988 | Yoshida et al. | 369/50 X |
| 4,773,052 | 9/1988 | Sugiura | 358/342 X |
| 4,780,865 | 10/1988 | Yamakawa | 369/44.32 |
| 4,885,644 | 12/1989 | Ishii et al. | 369/58 X |

FOREIGN PATENT DOCUMENTS

| | | |
|---|---|---|
| 0216637 | 4/1987 | European Pat. Off. . |
| 3533647 | 3/1986 | Fed. Rep. of Germany . |
| 2143973 | 2/1985 | United Kingdom . |
| 2156069 | 10/1985 | United Kingdom . |

OTHER PUBLICATIONS

Pioneer Service Manual for Laser Disc Player VP-1000, May 1980.

Primary Examiner—Roy N. Envall, Jr.
Assistant Examiner—W. R. Young
Attorney, Agent, or Firm—Lewis H. Eslinger; Jay H. Maioli

[57] ABSTRACT

An optical disk player for reproducing information stored on various types of optical disks, such as video disks and compact disks having diameters different from that of the video disk, for recording audio signals and for recording audio and video signals, wherein a skew sensor detects an inclination of an optical disk relative to an optical pickup, a skew servo mechanism controls the inclination of the optical pickup, relative to the optical disk on the basis of the detected inclination, a disk size detector detects the size of the disks, a disk detector detects signals, recorded in audio and audio/video compact disks indicative of the type of optical disk, and on the basis of the detected outputs from the size detector and the disk detector, the skew servo is effected continuously from the innermost track to outermost track or slightly before the outermost track when the disk is a video disk or audio/video compact disk, but wherein the skew servo is stopped at a predetermined position inwardly of the outerost track when the disk is an audio compact disk.

6 Claims, 7 Drawing Sheets

OPTICAL DISK PLAYER WITH DISK SIZE AND PICKUP LOCATION RESPONSIVE SKEW SERVO CONTROL

BACKGROUND OF THE INVENTION

1. Field of the Invention

The present invention relates to an optical disk player for reproducing optical disks such as a video disk, a compact disk having a diameter different from that of the video disk for recording audio signals and a compact disk different in diameter from that of the video disk for recording audio and video signals, and more particularly to a skew servo system for an optical pickup provided therein.

2. Description of the Prior Art

Conventional optical disk players for reproducing audio signals stored on an optical disk using a skew servo are disclosed for example, in Japanese Patent Applications Nos. 58-140139, 60-2956, and Official Gazette of Laid-open Patent Application No. 61-162835.

Reference is first made to such conventional optical disk player. Generally in such a conventional optical disk player, a laser beam is converged by an objective lens for a reproducing signal, wherein its resolution depends either on how much the laser beam is converged, or the beam spot diameter. Therefore, the beam spot diameter is determined by the wavelength of a light source, the ratio of the focal length to the diameter of the objective lens (generally expressed by NA (Numerical Aperture) value), and other factors.

Conventionally, a helium-neon laser is used as a light source. However, the helium-neon laser causes the apparatus or the optical disk player to be large in size and expensive. Accordingly, it is a recent tendency to employ a semiconductor laser as the light source because it is economical and suitable for making the apparatus smaller.

The semiconductor laser has a wavelength of 780 nm which is longer than that of the helium-neon laser which is 623.8 nm. For this reason, in order to obtain a beam spot diameter of the semiconductor laser which can provide the same resolution as that using the helium-neon laser as the light source, the NA value of the objective lens must be increased, for example, to approximately 0.5.

However, such an increase in the NA value of the objective lens results in a problem of crosstalk from the adjacent tracks caused by the coma aberration of the objective lens when the optical axis of the laser beam is not vertical to the recording surface of the disk.

Specifically referring now to FIGS. 1A and 1B, when an optical axis 2 of the laser beam is perpendicular to the recording surface of a disk 1 as shown in FIG. 1A, a detected output D shown in FIG. 1A contains crosstalk from adjacent tracks $T_1$ and $T_2$ sufficiently small with respect to the output from a main track $T_0$. However, if the optical axis of the laser beam is not perpendicular to the recording surface of the disk 1, but is instead at an angle $\Theta$ (hereinafter called the skew or skew angle of the disk 1) as shown in FIG. 1B, the crosstalk from the adjacent tracks, from the track $T_1$ in this case, is increased in the detected output D.

The crosstalk level Lc is expressed by the following expression:

$$Lc \propto Wcm \propto \left( \frac{NA^3}{\lambda} \cdot \theta \right)^2$$

where Wcm represents the coma aberration, $\lambda$ a laser beam wavelength and $\Theta$ the skew angle of the disk in its radial direction. It is therefore apparent from the expression that if the NA value becomes large, the crosstalk level Lc is no longer negligible. For example, assuming that the laser beam wavelength $\lambda$ is 780 nm, the track pitch 1.67 $\mu$m and NA is 0.5, a condition $\Theta \leq 0.5$ has to be satisfied for assuring the crosstalk level Lc = −40 dB.

Incidentally, the skew of the disk surface in which the disk surface is not perpendicular to the optical axis is caused by various causes such as an inclination of the spindle shaft, a distortion of the disk turntable, a skew inherent in the disk and so on. The principal cause among these causes is considered to be the skew inherent in the disk, and the skew angle with respect to the radial direction of the presently manufactured disk ranges from $1 \leq \Theta \leq 2$. It is therefore necessary for the case where the semiconductor laser is employed for the light source to detect the skew in the radial direction of the disk (hereinafter the term "skew" is assumed to include the skew caused by reasons other than the skew inherent in the disk) for countermeasures to the increase in crosstalk.

An apparatus for reproducing an optical disk or optical disk player will hereinafter be explained with reference to FIGS. 2–15.

FIGS. 2–5 show a skew sensor employed in an optical disk reproducing apparatus for detecting the skew of an optical disk. FIG. 2 is a top plan view taken from the upper side of the optical disk 1 (however, the disk is not shown in the drawing), FIG. 3 is a view taken along the radial direction of the disk 1, and FIG. 4 is a view taken from a direction perpendicular to the radial direction of the disk 1 (These drawings illustrate the skew sensor in cross-section for ease of explanation). FIG. 5 is a perspective view of the skew sensor.

A diffusion light source is used as the light source. The example shown in FIGS. 2–5 employs a light emitting diode (LED) 9 which is arranged to diffuse the light on the light emitting surface thereof. The light emitting surface of the light emitting diode is formed in a rectangular shape.

The light, emitted from the light emitting diode and reflected by the disk 1, is received by a photo detector 10 through a lens 11. This photo detector 10 is a two-divided photo detector which has its light detecting area divided into two parts.

The light emitting diode 9, the photo detector 10 and the lens 11 are attached to a housing member 12 formed in the shape of a cylinder. Specifically, the lens is attached to one opening end side of the housing member 12, while the light emitting diode 9 and the photo detector 10 are mounted on the housing member 12 at the other opening end on the focal plane of the lens 11 such that they are located at the left and right sides of a plane including the optical axis 11A of the lens 11. The housing member 12 thus provided with the light emitting diode 9, the photo detector 10 and the lens 11 is placed, as shown in, for example, FIG. 3, in a manner such that the lens 11 faces the disk 1 and the light emitting diode 9 and the light detector 10 are aligned in the direction perpendicular to the skew detecting direction of the disk 1. Since this skew sensor is provided for detecting the skew of the disk 1 in its radial direction, the light emitting diode 9 and the photo detector 10 are arranged in the direction perpendicular to the radial direction of the disk 1. The light emitting diode 9 and the photo detector 10 are located such that the optical axis of the optical pickup is perpendicular to the recording surface of the disk 1. The two-divided photo detector 10 is arranged in a manner such that its dividing line 10C is located along the direction perpendicular to the skew detecting direction or the direction perpendicular to the radial direction of the disk 1 and intersects the plane that includes the optical axis 11A.

With the construction as described above, the real image of the surface portion of the light emitting diode 9 is focused on the photo detector 10 as an image 13 as shown by a hatched area in FIG. 2. The principle of such operation will next be explained with reference to FIGS. 6 and 7. FIG. 5 is a perspective view showing only the light emitting diode 9 and the two-divided photo detector 10.

If the optical axis 11A of the lens 11 is perpendicular to the recording surface of the disk the optical path of the light incident on the recording surface of the disk 1 is perfectly symmetrical to that of the light reflected from the recording surface of the disk 1, as shown in FIG. 6. Therefore, the real image of the light emitting diode 9 that is placed on the left-hand side of the plane including the optical axis 11A of the lens 11 and along the radial direction of the disk is focused on the focal plane of the lens 11 located at the right-hand side of the above described plane. The portion above the disk 1 in FIG. 6 is the portion which is reflected on the recording surface of the disk 1. Thus, if FIG. 6 is folded along the recording surface of the disk 1, FIG. 7 is derived wherein the real image on the light emitting diode 9 is focused exactly at the position of the photo detector 10.

When the optical axis 11A of the lens 11 is perpendicular to the recording surface of the disk 1 as shown in FIG. 6, the image 13 is focused equally over divided areas 10A and 10B of the two-divided photo detector 10 by the same amount as shown in FIG. 9B, so that photo-detected outputs from the divided areas 10A and 10B are equal to each other and hence the difference therebetween is zero.

If the optical axis 11A of the lens 11 is not perpendicular to the recording surface of the disk 1 due to the skew of the disk 1 as shown in FIG. 8, the position of the image of the light emitting diode 9 is displaced in the direction perpendicular to the radial direction of the disk 1 as indicated at 14 in FIG. 8 due to the skew of the disk 1, so that the image 13 on the photo detector 10 is focused such that the region 10B includes a larger portion of the image 13 as shown in FIG. 9C.

If the disk 1 is tilted in the direction opposite to that shown in FIG. 8, that is, if the disk 1 has a skew in which the right hand side of the disk 1 is tilted downwards, the image 13 on the photo detector 10 is focused such that the region 10A includes a larger portion of the image 13 as shown in FIG. 9A.

As described above, it is possible to detect the direction and amount of the skew of the disk 1 by using the difference between the directed outputs of the optical image 13 from the respective areas 10A and 10B of the photo detector 10.

Next, reference is made to how to control the optical axis of the optical pickup to be always perpendicular to the recording surface of the disk 1 by the use of the skew sensor for the optical disk 1 as described above.

Briefly, the light emitting diode 9 and the light detector 10 hold the aforementioned relationship with the optical pickup and are arranged to move together with the optical pickup, as will be described later.

FIG. 10 shows a movable portion (skew servo mechanism) including the optical pickup and the skew sensor. In the example of FIG. 10, an optical block 20 comprises the optical system of an optical pickup 40 for detecting recorded information in the form of pits formed on the disk 1 and the optical system of a skew sensor 41. Focussing servo and tracking servo for the optical pickup 40 are effected by a two-axis optical driving section 21.

The aforementioned housing member 12 of the skew sensor 41 is mounted on the block 20 in the longitudinal direction of a recording track T relative to the optical axis position 21A of the optical pickup 40. Therefore, the plane including the optical axis 11A of the lens 11 also includes the optical axis 21A of the optical pickup 40.

The optical block 20 constructed as described above is supported by a shaft 23 which is placed in the direction perpendicular to the radial direction of the disk 1 in a manner such that the optical block 20 is permitted to rotate about the axis 23 to incline in the radial direction of the disk 1.

The optical block 20 is provided with a worm gear 24 mounted on the bottom surface thereof The shaft 23 is rotatably inserted into shaft apertures 29A and 29B bored through two side plates 28A and 28B in a manner such that the worm gear 24 engages with a worm 27 which is rotated by a small size motor 26 fixed on a supporting base 25. Thus, when the worm 27 is rotated by the motor 26, the worm gear is rotated by a rotating angle corresponding to the rotation of the worm 27, whereby the optical block 20 is inclined in the radial direction of the disk 1. It will be therefore understood that the optical axis 21A of the optical pickup 40 can be controlled so as to be always perpendicular to the recording surface of the disk by controlling the motor 26 in response to the skew detecting output from the skew sensor 41. The supporting base 25 is slideable along two parallel guiding rods 30 in the radial direction of the optical disk 1 by a motor not shown.

FIG. 11 is a block diagram showing the example of a control system for the motor 26. Detecting outputs SA and SB from the respective divided areas 10A and 10B of the two-divided photo detector 10, in proportion to the occupied areas by the optical image 13, are respectively supplied through amplifiers 31A and 31B to an operational or calculating circuit 32 which effects the following calculation:

$$\frac{SA - SB}{SA + SB}$$

The output from the operational circuit 32 is supplied through a driving circuit 33 to the motor 26 as a skew error signal. The motor 26 is thus controlled in proportion to the difference SA−SB between the detected outputs which is fed back thereto so as to make the outputs SA and SB equal to each other, that is, SA−SB=0 is satisfied. In other words, the optical axis 21A of the optical pickup 40 is controlled to be always perpendicular to the recording surface of the disk 1.

In the above-mentioned example, it is preferable that the surface of the light emitting diode 9, which is substantially focused on the photo detector as the image of the diffusing light source body, has a rectangular shape as shown in FIG. 12. This is because the skew detecting output of such a shape has a rectilinear characteristic with respect to the skew angle ΔΘ as shown in FIG. 13. On the contrary, if the shape of the surface of the light emitting diode 9 is circular as shown in FIG. 14, the skew detecting output characteristic is curvilinear with respect to the skew angle ΔΘ as shown in FIG. 15, thereby making it difficult to control the motor 26.

The diffusion light source is not limited to the above-mentioned one which employs a light emitting diode which diffuses light on the light emitting surface thereof. For example, a diffusion member masked in a rectangular shape and a lamp may be used in place thereof. Alternatively, a rectangular window may be provided through which the light emitted from the diode 9 is diffused, instead of forming the surface of the diode 9 in a rectangular shape.

As described above, the conventional optical disk reproducing apparatus detects the skew of a disk in such a manner that a diffusion type light source emits a light which is reflected once on the recording surface of the disk through the lens so as to focus the real image of the light source on the two-divided photo detector, with the result that the apparatus can be manufactured with less number of parts and more economically than apparatus using a laser as a light source.

Since the apparatus employs a diffusion light in place of a parallel light, one can substantially avoid erroneously detecting portions in which the contents of recorded information on the disk are changed as the skew of the disk.

Further, since the light source and the photo detector can be arranged in the same focal plane of the single lens, the skew sensor can be simply constructed. Also, the optical system can be readily mounted in the single housing so that the construction thereof can be made stable.

Specific explanation will next be given to optical disks such as a video disk and compact disks, each having a radius different from that of the video disk, for recording an audio signal and for recording audio and video signals which are all reproduced by the optical disk reproducing apparatus.

The video disk is generally referred to as a "laser disk (LD)" and there are two types, one having a diameter of 200 mm and the other having a diameter of 300 mm. The LD is used for recording a video signal including an audio signal. The compact disk for recording audio and video signals is referred to as a "CDV" and has a diameter of 120 mm. The CDV is used for recording mainly the audio signal and partially the video signal. The compact disk for recording the audio signal is referred to as a "CD" and there are two types, one of which has a diameter of 120 mm and the other of which has a diameter of 80 mm. The CD is used for recording the audio signal.

These CDV and CD respectively have a 4-bit address signal (ADR) recorded in a subcode area arranged in a lead-in track which is placed in the innermost periphery of the disks near the center. In the CD of either 120 mm diameter or 80 mm diameter, the address signal ADR=1=0001 (mode 1) is recorded in every track, while in the CDV the address signals ADR=1=0001 (mode 1) and ADR=4=0100 (mode 4) are alternately recorded in every three tracks. Thus, if ADR=1=0001 (mode 1) only is detected in the lead-in track, the particular disk is determined to be a CD. If ADR=4=0100 (mode 4) is detected, the disk is determined to be a CDV.

Assume that as shown in FIG. 16 the objective lens of the optical pickup 40 moves along one radius of the optical disk 1 while the relative position between the skew sensor 41 and the objective lens of the optical pickup 40 is such that they are closely positioned with a predetermined spacing therebetween at the outermost track (circular track) of the LD having a diameter of 300 mm.

It has been discovered that when the objective lens of the optical pickup 40 is located at the outermost track (circular track) of an optical disk having a smaller diameter, that is, the CD having a diameter of 80 mm, the skew sensor 41 is positioned outside the CD so that it cannot detect the skew of the CD or the inclination of the optical pickup 40 relative to the optical disk 1, whereby the skew servo does not operate correctly.

However, if the relative position between the skew sensor 41 and the objective lens of the optical pickup 40 is determined such that they are closely positioned with a predetermined spacing therebetween at the same circular track in the vicinity of the outermost track of the 80 mm CD while the objective lens of the optical pickup 40 is located at the outermost track of e.g. a 300 mm LD, which may be more largely skewed, the skew sensor 41 is located at a track far from the track at which the objective lens of the optical pickup is located. It is therefore impossible to correctly detect the skew of the optical disk 1 and consequently servo-control the optical pickup 40 in a correct manner by the present skew servo mechanism.

Generally, the skew angle is wider as the diameter of the optical disk is larger. A smaller diameter disk in which video signals are recorded is more influenced by crosstalk between adjacent tracks due to its skew in comparison with a disk of the same size in which audio signals are recorded.

OBJECTS AND SUMMARY OF THE INVENTION

In view of the problems mentioned above, it is an object of the present invention to provide an optical disk player for reproducing information stored on a video disk and compact disks, each having a diameter different from that of a video disk, for recording audio signals and for recording audio and video signals which is capable of effecting the skew servo operation without errors regardless of the size of optical disks being used.

To achieve the above object, the present invention provides an optical disk player capable of reading information recorded on various types of optical disks, such as a video disk, an audio compact disk whose diameter is different from the video disk or a video/audio disk, wherein both the audio compact disk and the video/audio compact disk have lead-in tracks for storing identification signals for identifying the type of compact disk. The disk player comprises an optical pickup for reading stored information from a disk means for detecting the size of said disk, means for detecting said identification signal from the lead-in tracks of said disk, a skew sensor for detecting an inclination angle of the skew of the disk relative to the pickup, means for adjusting the inclination of said disk relative to said pickup, skew servo means for supplying a skew signal to the adjusting means upon detection of an inclination by the skew sensor, said skew signal being held at its value obtained when the optical pickup is at a predetermined radial track location relative to said disk, when the size detecting means detects that the disk size is a compact disk and the identification signal detecting means detects that the disk is an audio compact disk.

The above and other objects, features and advantages of the present invention will become apparent from the following detailed description of the preferred embodiment take in conjunction with the accompanying drawings, throughout which like reference numerals designate like elements and parts.

DETAILED DESCRIPTION OF THE EMBODIMENT

Figure 17:
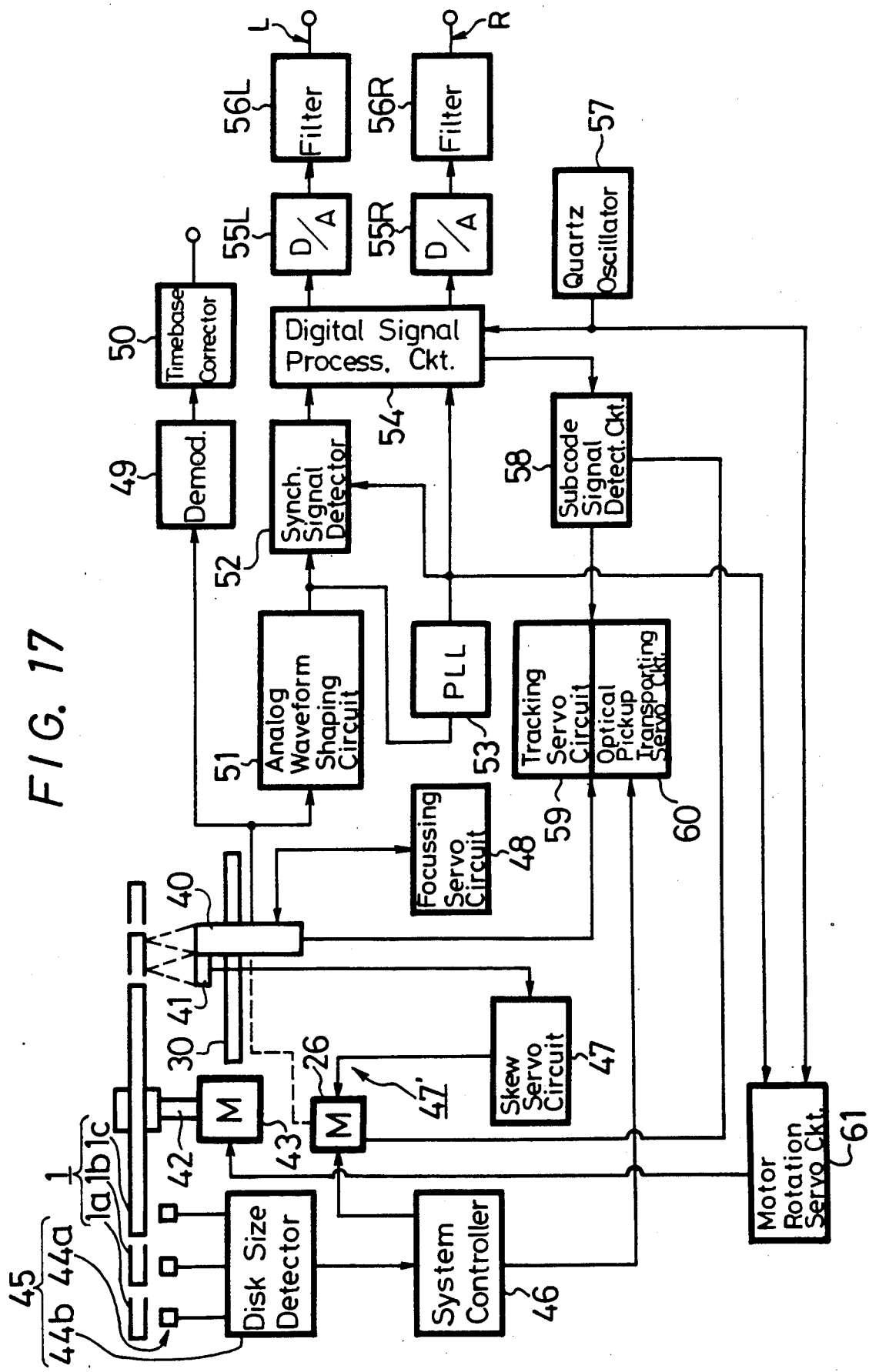
FIG. 17 is a circuit block diagram showing an arrangement of an embodiment of the present invention.

An embodiment of the present invention will hereinafter be described with reference to FIG. 17.

Reference numeral generally designates an optical disk which may be an LD, indicated by 1a, having a diameter of 300 mm, a different LD, indicated by 1b, having a diameter of 200 mm, and a CDV or CD, indicated by 1c, having a diameter of 120 mm. A CD having a diameter of 80 mm is omitted in the drawing.

A spindle motor 43, to which a spindle 42 is connected, is rotation-servo-controlled by a rotation servo circuit 61 to rotate the optical disk 1. An optical pickup 40 focuses a laser beam emitted from a light source such as a laser diode or the like on the surface of the optical disk 1 through an objective lens in a manner similar to that shown in FIG. 10. The reflected light from the optical disk 1 is focused through the objective lens on a photo detecting element such as a photo diode or the like which generates modulated video and audio signals. The optical pickup 40 is provided with focus error detecting means and tracking error detecting means, though these are not shown in the drawing.

The modulated video signal from the optical pickup 40 is supplied to a video signal demodulator 49 to be demodulated, and the demodulated output therefrom is supplied to a time base corrector (TBC) 50 which outputs the video signal.

The modulated audio signal from the optical pickup 40 is supplied to an analog waveform shaping circuit 51, the waveform-shaped output of which is supplied to a sychronizing signal detecting circuit 52 and a phase locked loop (PLL) circuit 53. A clock signal generated from the PLL circuit 53 is fed to the synchronizing signal detecting circuit 52. The respective outputs from the synchronizing signal detecting circuit 52 and the PLL circuit 53 are supplied to a digital signal processing circuit 54. The digital signal processing circuit 54 delivers left-channel and right-channel digital audio signals which are respectively supplied through digital-to-analog (D/A) converters 55L and 55R to filters 56L and 56R which output left-channel and right-channel audio signals L and R, respectively. The digital signal processing circuit 54 is fed with a reference signal (clock signal) from a quartz oscillator 57.

The optical pickup 40 is connected to a focussing servo circuit 48 and an optical pickup transporting servo circuit 60. A transporting mechanism such as a motor for carrying the optical pickup 40 in the radial direction of the optical disk 1 on guide 30 is omitted in FIG. 17.

A digital signal from the digital signal processing circuit 54 is supplied to a subcode signal detecting circuit 58 for detecting a subcode signal which is supplied to a tracking servo circuit 59 and the transporting servo circuit 60. As described above, the subcode signal indicates whether the disk is a CDV or a CD when it is 120 mm. The tracking servo circuit 59 is connected to the optical pickup 40. The optical pickup transporting servo circuit 60 is controlled by a system controller 46.

A skew sensor 41, specifically constructed as described above with reference to FIGS. 2-10, generates a skew detecting signal which is supplied to a skew servo circuit 47 in a skew servo mechanism 47'. The skew servo mechanism 47' and circuit 47 are specifically constructed in the same manner as described in connection with FIGS. 2-10.

A disk size detecting means 45 comprises a light source section (not shown), a plurality of light receiving sections 44A arranged in different positions from each other in the radial direction of the optical disk 1 and a disk size detecting circuit 44B for detecting the diametrical size of the optical disk 1 loaded in the reproducing apparatus in response to the presence or absence of the light received by the plurality of light receiving sections 44A. The detected output from the disk size detecting circuit 44B is supplied to the system controller 46.

Figure 1A:
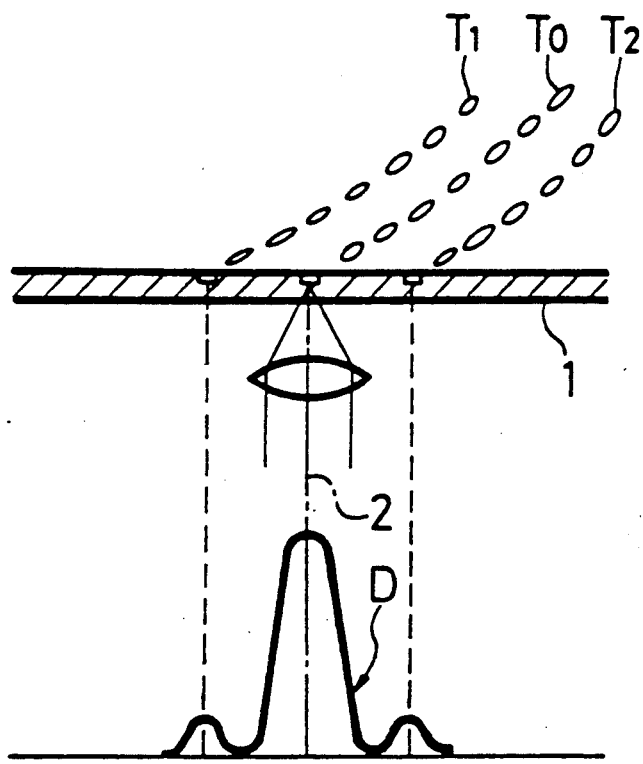
FIGS. 1A and 1B are diagrams showing the output signals for various skew positions of an optical disk.
Figure 1B:
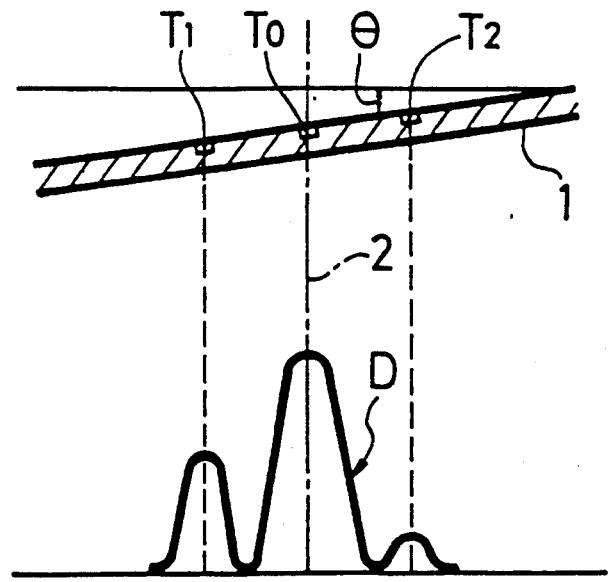
Figure 2:
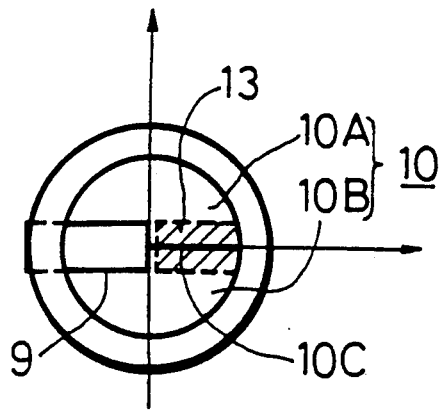
FIGS. 2, 3 and 4 are diagrams respectively showing an arrangement of a previously proposed skew sensor.
Figure 5:
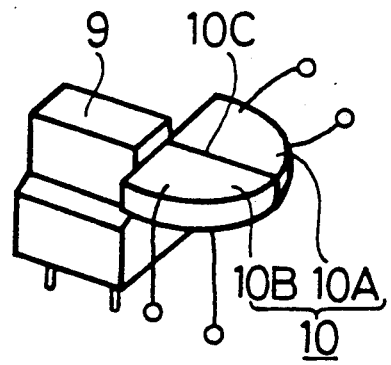
FIG. 5 is a perspective view of part of the skew sensor illustrated in FIGS. 2, 3 and 4.
Figure 3:
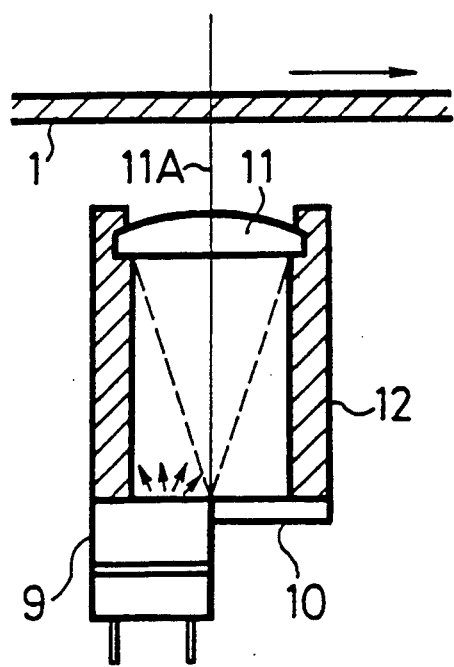
Figure 4:
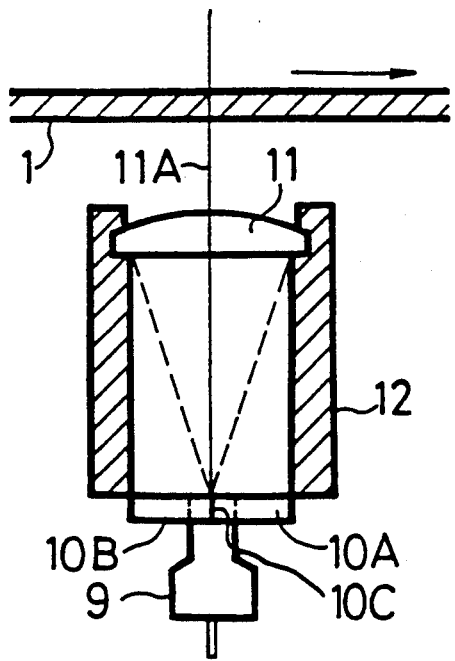
Figures 6, 7, 8, 9A, 9B, 9C:
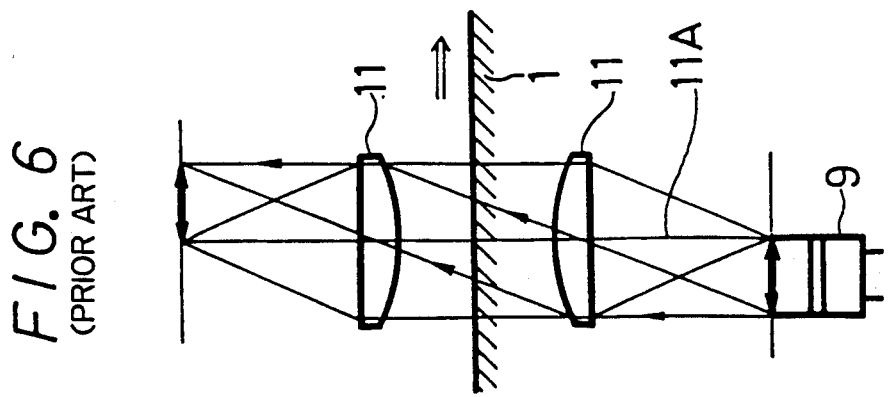
FIGS. 6-8 and FIGS. 9A and 9C are diagrams used for explaining the operation of the previously proposed skew sensor of FIGS. 2-5.
Figure 10:
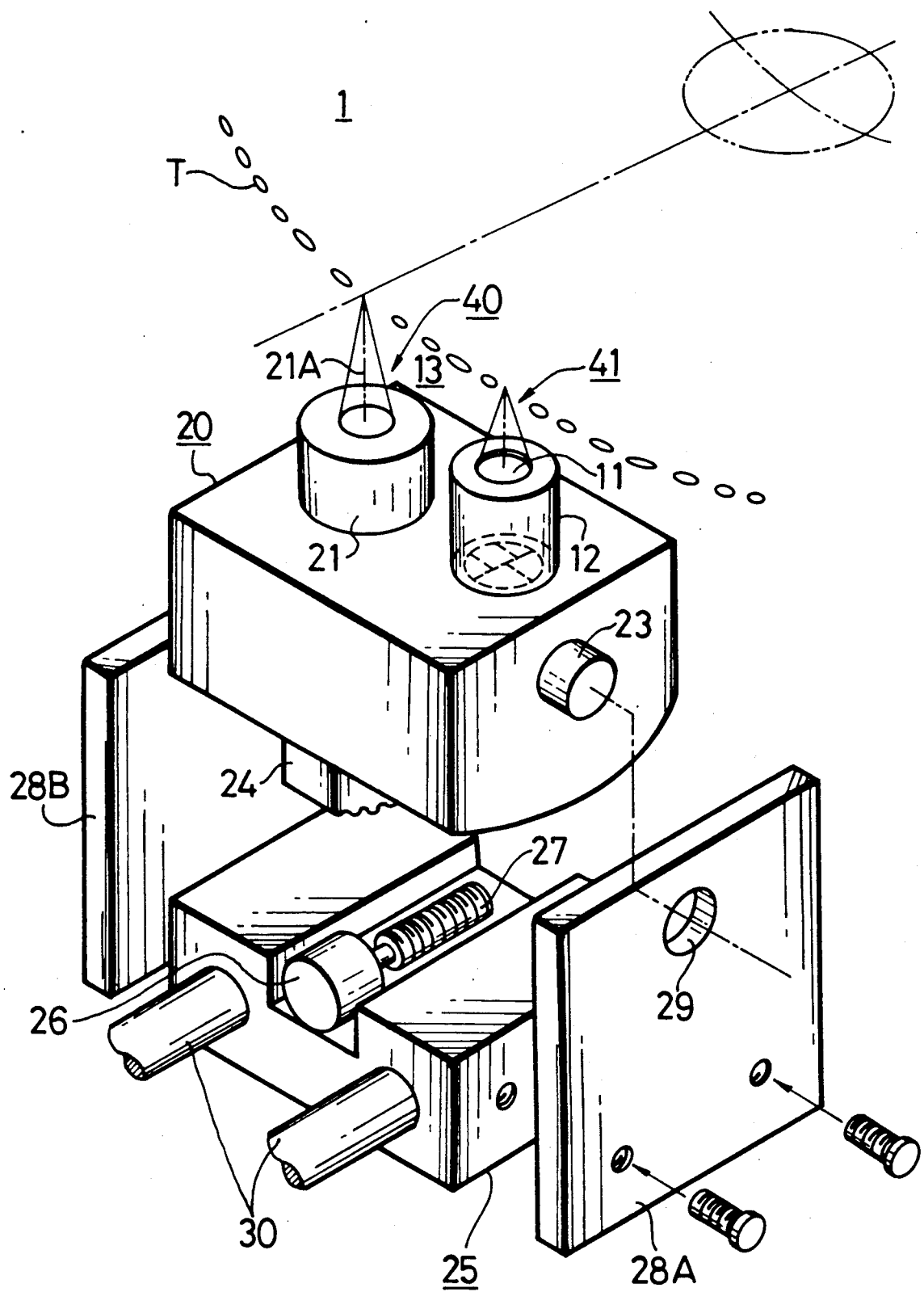
FIG. 10 is a perspective view showing a previously proposed skew servo mechanism for an optical pickup.
Figure 11:
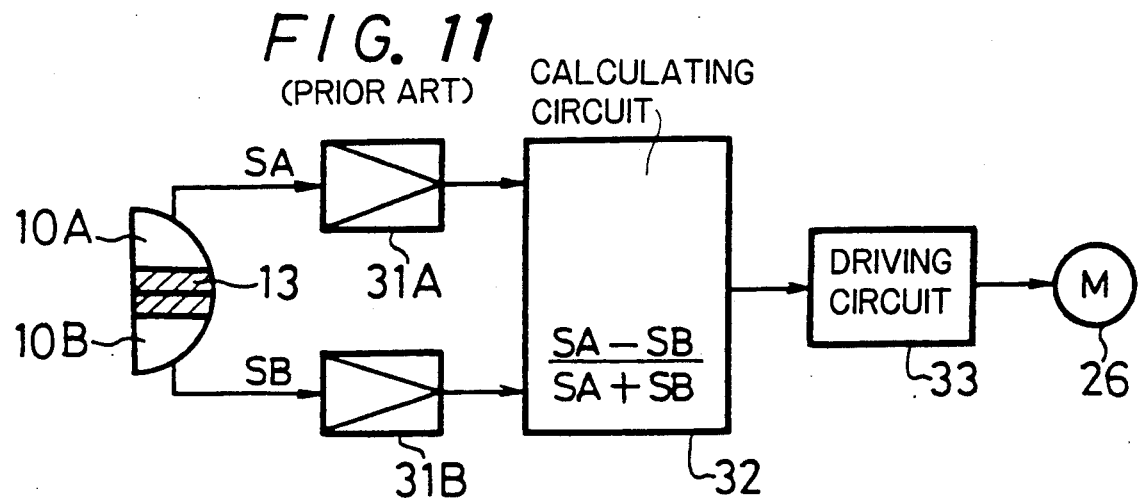
FIG. 11 is a circuit block diagram showing a control system of the skew servo mechanism illustrated in FIG. 10.
Figure 12:
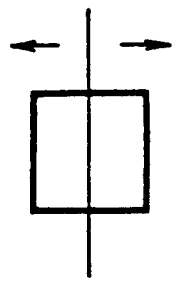
FIGS. 12 and 13 are a diagram and a graph respectively showing a shape of a diffusion light source employed in conventional optical disk players and its detected output characteristic.
Figure 13:
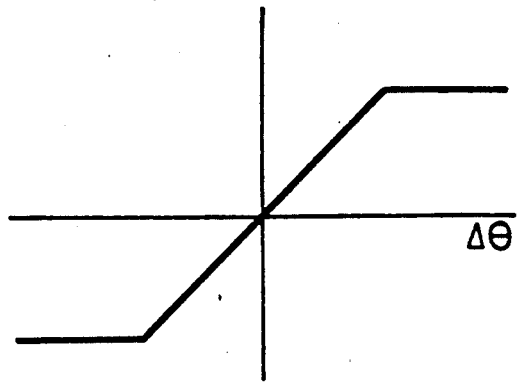
Figure 14:
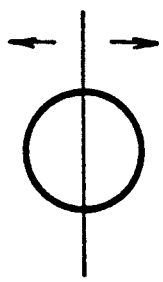
FIGS. 14 and 15 are a diagram and a graph respectively showing another shape of a diffusion light source and its detected output characteristic.
Figure 15:
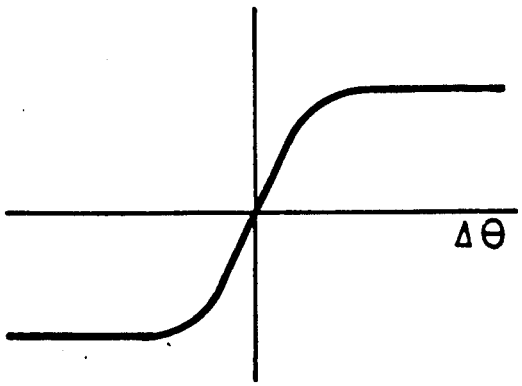
Figure 16:
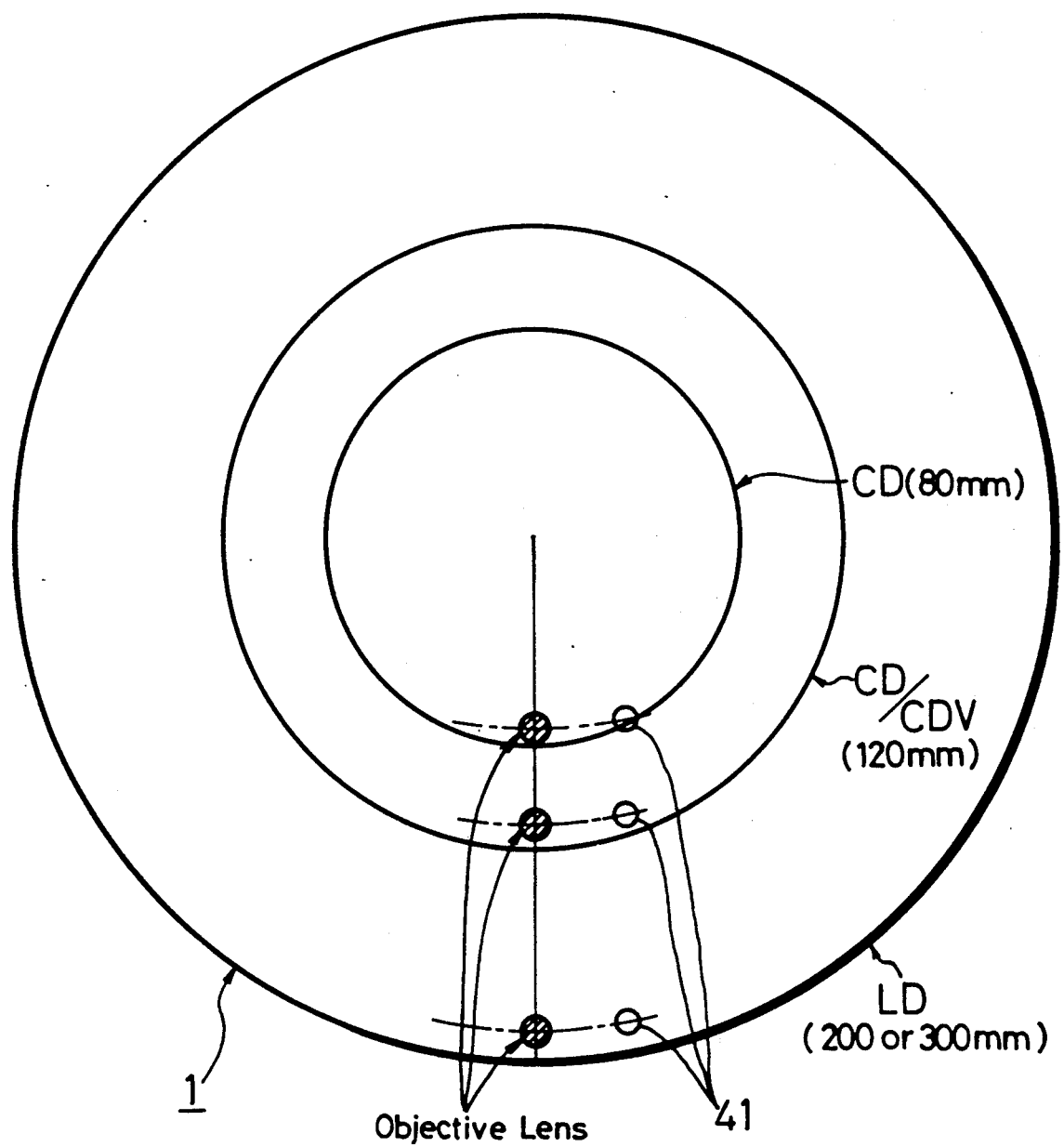
FIG. 16 is a diagram of three differently sized disks for explaining problems inherent in the previously proposed skew servo mechanism.

The skew sensor 41 is integrated with the optical pickup 40 as shown in FIG. 10. A motor 26, similar to that in FIG. 10, is provided to rotate the optical pickup 40 and the skew sensor 41 in a plane including the optical axis of the objective lens of the optical pickup 40, the optical axis of the skew sensor 41 and a radius of the optical disk 1 in a manner such that the optical axis of the objective lens of the optical pickup 40 is perpendicular to the surface of the optical disk 1. The motor 26 is controlled by the system controller 46, the skew servo circuit 47 and the subcode detecting circuit 58.

Thus, the relative position between the skew sensor 41 and the optical pickup 40 is caused to be such that the optical pickup 40 moves along a radius of the optical disk 1, and that the skew sensor 41 and the optical pickup 40 are closely positioned at a predetermined track in the vicinity of the outermost track of the LD having a diameter of 300 mm, with a predetermined space therebetween.

Reference is next made to the operation of the optical disk player or reproducing apparatus of the present embodiment.

The optical disk reproducing apparatus operates as follows, depending upon which type and size optical disk is loaded in the apparatus:

1. LD having a diameter of 300 mm or 200 mm.

The size detector 45 detects that the optical disk is an LD having the diameter of 300 mm or 200 mm. The system controller 46 controls the motor 26 on the basis of the detection such that the optical pickup 40 is servo-controlled by the skew servo mechanism 47' while the optical pickup 40 is transported radially from the innermost track to the outermost track (inside the outer periphery of the disk) for reproducing data signals recorded therein.

2. CD having a diameter 80 mm.

The size detector 45 detects that the optical disk 1 has a diameter of 80 mm, and the subcode detecting circuit 58 detects that the subcode area in the lead-in tracks contains only the address signal ADR=1=0001 (mode 1), whereby the optical disk 1 is recognized to be a CD having a diameter of 80 mm. The system controller 46 and the subcode detecting circuit 58 control the motor 26 on the basis of the detected results. The optical pickup 40 is servo-controlled by the skew servo mechanism 47' while transported radially from the innermost track of the CD to a track at a predetermined diameter (70 mm) (slightly inside the outermost track of the CD such that the skew sensor 41 is not positioned outside the CD) for reproducing data recorded therein. The optical pickup is held in the same skew servo control condition as it is at the predetermined track while it is transported radially outward from the track at the predetermined diameter to the outermost track, by holding the skew signal supplied from the skew servo circuit 47 to the skew motor 26 at the same value.

3. CDV or CD having a diameter of 120 mm.

The size detector 45 detects that the optical disk 1 has a diameter of 120 mm (and therefore either a CDV or a CD), and the subcode detecting circuit 58 detects the address signals ADR=4=0100 (mode 4) and ADR=1=0001 (mode 1) or only the address signal ADR=1=0001 (mode 1) as the subcode signal in the lead-in track of the optical disk 1, whereby the optical disk 1 is recognized respectively to be a CDV or a CD, and having a diameter of 120 mm. The system controller 46 and the subcode detecting circuit 58 control the motor 26 on the basis of the detected results. If the optical disk 1 to be reproduced is a CDV, the optical pickup 40 is servo-controlled by the skew servo mechanism 47' while the optical pickup 40 reproduces the data from the innermost track to the outermost track of the CDV. On the contrary, if the optical disk 1 is a CD having a diameter of 120 mm, the optical pickup 40 is servo-controlled by the skew servo mechanism 47' while the optical pickup 40 reproduces the data from the innermost track to the track at the predetermined diameter (the above-mentioned 70 mm) which is positioned slightly inside the outermost track of the CD. While being transported from the track at the predetermined diameter to the outermost track, the optical pickup 40 is held in the same skew servo condition as is positioned at the predetermined track, for example, by holding the skew signal supplied from the skew servo circuit 47 to the skew motor 26.

Thus, when the objective lens of the optical pickup 40 is positioned at the outermost track of a small optical disk, that is, an 80 mm CD, there may be a fear that the skew sensor 41 is positioned outside the optical disk 1 thereby creating a false skew reading However, for all tracks outward from the predetermined track (e.g. 70 mm), the skew servo uses the same skew reading obtained when the optical pickup 40 is at the predetermined track, thereby preventing the skew servo from erroneously operating. Even though the skew servo is held in the same condition, the diameter of the CD is small, i.e. 80 mm and moreover the signal recorded thereon is an audio signal so that the skew of the optical disk is small and changes little, whereby any crosstalk due to the skew is considered to be negligible.

According to the present invention as described above, in the optical disk player for reproducing the video disk and the compact disks, each having a diameter different from that of the video disk, for recording the audio signal and for recording the audio and video signals, it is possible to effect the skew servo operation without errors regardless of the size of optical disks to be reproduced thereby.

The above description is given on a single preferred embodiment of the invention but it will be apparent that many modifications and variations could be effected by one skilled in the art without departing from the spirit or scope of the novel concept of the invention so that the scope of the invention should be determined by the appended claims only.

We claim:

1. An optical disk player capable of reading information stored on a video disk, on an audio compact disk having a diameter different from said video disk, and on a video and audio compact disk, wherein both the audio compact disk and the video and audio compact disk have lead-in tracks storing identification signals for identifying the type of compact disk, said disk player comprising:

an optical pickup for reading stored information from a disk;
means for detecting the size of the disk;
means for detecting the identification signal from the lead-in tracks of the disk;
a skew sensor for detecting an inclination angle of skew of the disk relative to said optical pickup;
means for adjusting said angle;
skew servo means for supplying a skew signal to said means for adjusting upon detection of an inclination by said skew sensor, said skew signal being adjusted during reading from a beginning point to a predetermined radial track location on the disk but being held at its value obtained when said optical pickup is at said predetermined radial track location on the disk during reading at locations radially outward from the predetermined radial track location, when said means for detecting the size detects that the disk is a compact disk and said means for detecting the identification signal detects that the disk is an audio compact disk, 2. An optical disk player according to claim 1, in which said means for adjusting comprises a skew motor.

3. An optical disk player according to claim 2, in which said skew motor is held by holding said skew signal.

4. An optical disk player according to claim 3, in which said predetermined location is at approximately 35 mm from the center of the disk.

5. An optical disk player according to claim 4, wherein the disk is a compact disk having a radius of about 40 mm.

6. An optical disk player according to claim 4, wherein the disk is a compact disk having a radius of about 60 mm.

* * * * *

UNITED STATES PATENT AND TRADEMARK OFFICE
CERTIFICATE OF CORRECTION

PATENT NO. : 5,056,075

DATED : October 8, 1991

INVENTOR(S) : Keiji Maruta et al.

It is certified that error appears in the above-identified patent and that said Letters Patent is hereby corrected as shown below:

```
On the title page:
In the Abstract, line 20, change "outerost" to
--outermost--
Col. 2, line 8, after "beam" delete "."
        line 24, change "1≦θ≦2" to --1°≦θ≦2°--
        line 57, after "lens" insert --11--
Col. 3, line 24, after "disk" insert --1,--
        line 31, after "disk" insert --1--
Col. 4, line 30, change "thereof The" to --thereof.  The--
        line 42, after "disk" insert --1--
Col. 6, line 24, delete "determined"
```

UNITED STATES PATENT AND TRADEMARK OFFICE
CERTIFICATE OF CORRECTION

PATENT NO. : 5,056,075
DATED : October 8, 1991
INVENTOR(S) : Keiji Maruta et al.

It is certified that error appears in the above-identified patent and that said Letters Patent is hereby corrected as shown below:

```
Col. 7, line 11, change "take" to --taken--
       line 22, after "9A" insert --,9B--
       line 47, after "numeral" insert --1--
Col. 10, line 10, after "disk" insert --1--

Col. 10, line 56, change "," to --.--
```

Signed and Sealed this

Sixteenth Day of March, 1993

*Attest:*

STEPHEN G. KUNIN

*Attesting Officer*     *Acting Commissioner of Patents and Trademarks*